David S. Wagener's
Impt. in Grafting Instruments.
No. 121,222.     Fig. 1.     Patented Nov. 21, 1871.
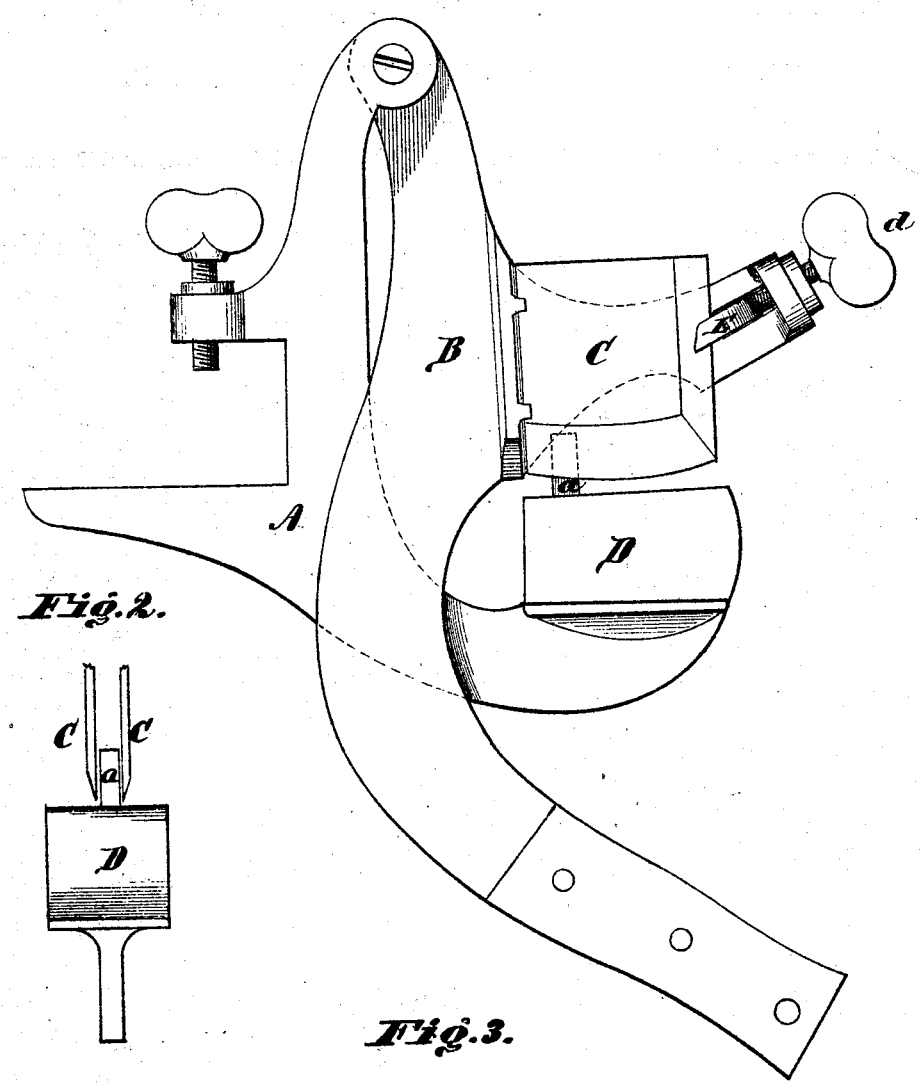
Fig. 2.
Fig. 3.
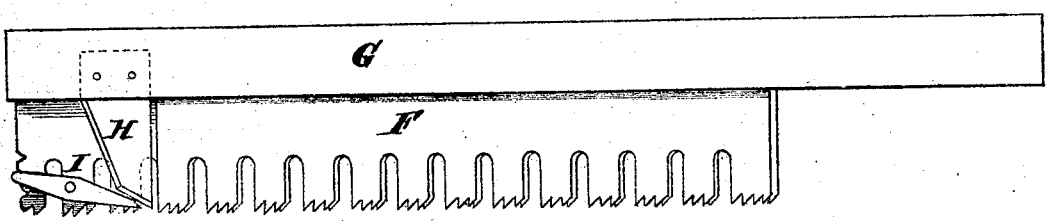
Witnesses:     Inventor.
John L. Lewis.
Charles Ketchum.     David S. Wagener.

UNITED STATES PATENT OFFICE.

DAVID S. WAGENER, OF PULTNEY, NEW YORK.

IMPROVEMENT IN GRAFTING INSTRUMENTS.

Specification forming part of Letters Patent No. 121,222, dated November 21, 1871; antedated November 11, 1871.

*To all whom it may concern:*

Be it known that I, DAVID S. WAGENER, of Pultney, in the county of Steuben and State of New York, have invented certain Improvements in Grafting Instruments, of which the following is a specification:

The first part of my invention relates to making an instrument that will cut cions precisely alike, and so that they will properly fit into t h kerf prepared to receive them, by means of cutters placed so as to cut the cions the shape and size required. The second part relates to cutting a kerf into a stock or grape-vine by means of adjustable saws and cutters that may be arranged to cut the size and shape desired.

Figure 1 is a side view of the cion-cutter. Fig. 2 is an end view of the cutters and block. Fig. 3 is a side view of the saws and cutters that are used to prepare the stock or vine for the cion.

A is the support for the cutter-stock. It is provided with an arm and thumb-screw to hold it to a table or bench in any ordinary manner, and is shaped as shown in Fig. 1. The upper end has a pivot-hole through it. The lower end terminates in a support for the cutting-block D. B is the cutter-stock. The shape is represented in Fig. 1. The upper end is pivoted to the support A. Near the middle it is provided with a projection that is made to hold the cutters. The lower end terminates in a handle, or may have a handle attached to it. C and C are the cutters that prepare the cion. They are placed one each side of the projection on the cutter-stock B, as represented in Figs. 1 and 2. They are held in place by means of knobs and the griper E and a thumb-screw, so that they may be adjusted to any angle or distance apart required, and may be raised or lowered to compensate for the wear of the block upon which they cut; and their angle may be varied by placing between them any substance that will keep them apart as required to cut the cion to fit the kerf made to receive it. D is the block on which the cion is placed while being prepared for setting. It is fastened to the lower end of the support A. The upper surface of the block has a channel, made as shown in Fig. 2. Into the channel the cion is placed while it is being prepared. In the channel there is a stop, $a$, which extends up between the cutters, as shown in Figs. 1 and 2. The use of this stop is to place the end of the cion against while being prepared. E is a griper that holds the cutters. It is fitted into a mortise in the projection on the cutter-stock, as shown in Fig. 1. The parts that come in contact with the cutters is made angular, to gripe the cutters when it is held against them by the thumb-screw $d$. F is one of a pair of saws. They are placed parallel to each other, and are held into the handle G by bolts or screws, so that they may be adjusted to cut the depth required, and they may be kept apart by any substance placed between them of the thickness required. G is the handle for the saws. It is made by placing two pieces one each side of the saws, and fastening them together with screws or bolts that pass through holes in the saws. H is a cutter that is used to smooth and enlarge the kerf, as required. It is held to the handle G with screws, and in position as shown in Fig. 3. I is a cutter that is fastened to one of the saws, as shown in Fig. 3. Its use is to cut off any portion of the wood that may be left between the saws.

I claim as my invention—

The instruments for preparing the cion and cutting the kerf to receive it, when they are made substantially as specified, and used for the purpose herein set forth.

DAVID S. WAGENER.

Witnesses:
CHARLES KETCHUM,
JOHN L. LEWIS.